United States Patent
Schaham et al.

[11] Patent Number: 5,988,506
[45] Date of Patent: Nov. 23, 1999

[54] SYSTEM AND METHOD FOR READING AND DECODING TWO DIMENSIONAL CODES OF HIGH DENSITY

[75] Inventors: Moshe Schaham, Rishon Lezion; Isac Boubis, Rehovot, both of Israel

[73] Assignee: Galore Scantec Ltd., Ness Ziona, Israel

[21] Appl. No.: 08/683,074

[22] Filed: Jul. 16, 1996

[51] Int. Cl.$^6$ ................................................. G06K 07/10
[52] U.S. Cl. ............................................................ 235/462.1
[58] Field of Search ................................... 235/462, 472, 235/463, 469, 470, 454, 494, 436

[56] References Cited

U.S. PATENT DOCUMENTS

| | | | |
|---|---|---|---|
| 4,900,907 | 2/1990 | Matusima et al. | 235/472 |
| 4,935,609 | 6/1990 | Wike, Jr. | 235/472 |
| 5,136,145 | 8/1992 | Karney | 235/475 |
| 5,155,343 | 10/1992 | Chandler et al. | 235/462 |
| 5,192,856 | 3/1993 | Schaham | 235/462 |
| 5,192,857 | 3/1993 | Detwiler | 235/467 |
| 5,210,398 | 5/1993 | Metlitsky | 235/462 |
| 5,233,170 | 8/1993 | Metlitsky et al. | 235/462 |
| 5,296,690 | 3/1994 | Chandler et al. | 235/462 |
| 5,304,786 | 4/1994 | Pavlidis et al. | 235/462 |
| 5,319,181 | 6/1994 | Shellhammer et al. | 235/462 |
| 5,319,185 | 6/1994 | Obata | 235/472 |
| 5,329,107 | 7/1994 | Priddy et al. | 235/494 |
| 5,335,007 | 8/1994 | Choi | 347/130 |
| 5,378,881 | 1/1995 | Adachi | 235/462 |
| 5,387,786 | 2/1995 | Peng | 235/462 |
| 5,484,999 | 1/1996 | Priddy et al. | 235/435 |
| 5,726,435 | 3/1998 | Hara et al. | 235/494 |

*Primary Examiner*—Thien Minh Le
*Attorney, Agent, or Firm*—Evenson, McKeown, Edwards & Lenahan, PLLC

[57] ABSTRACT

A system for reading two dimensional codes as well as regular bar codes. A laser scanner generates a narrow horizontal beam which scans a code by means of a scanning mirror in the vertical direction. This mirror receives the reflected beam and passes it on to a lens array to yield high quality imaging characteristics all across a large field of view angle. The lens array and an auto focusing system produce images of the scanning lines in the sensor plane—a CCD linear array. In the sensor's plane, sub aperture diaphragms generate partially overlapping fields of view from each of the elements of the lens array. The system Electronics, converts the CCD linear array electrical signals, into digital data. A module, synthesizes in real-time, the partially overlapping line sections of the image signal, into an integrated continuous line signal and stores them consecutively in the image memory. A system processor operates an autofocus, as well as code classification and decoding algorithms.

15 Claims, 6 Drawing Sheets

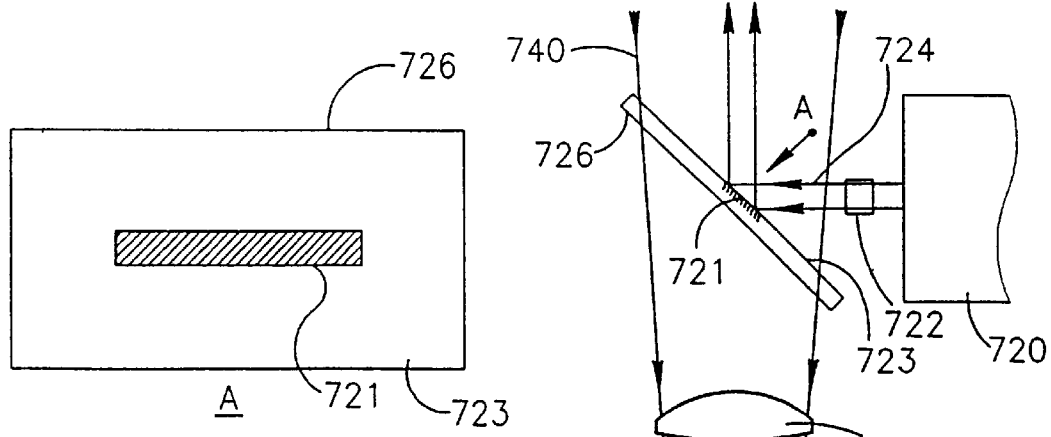
FIG. 7
FIG. 7A
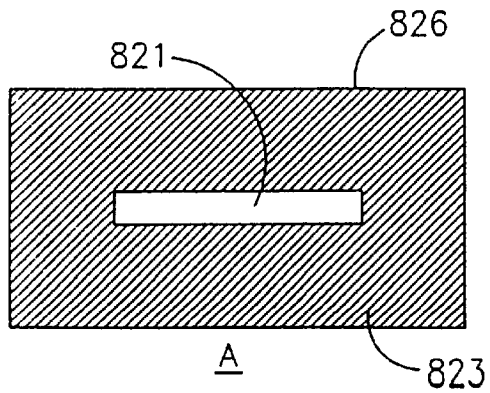
FIG. 8
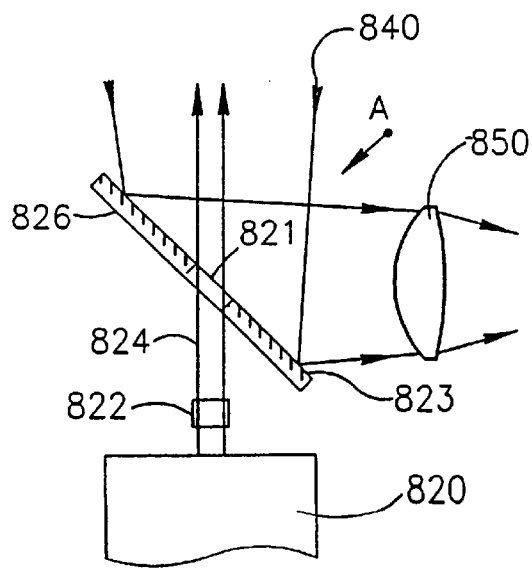
FIG. 8A

SYSTEM AND METHOD FOR READING AND DECODING TWO DIMENSIONAL CODES OF HIGH DENSITY

FIELD OF THE INVENTION

The invention relates to electro-optical scanning systems and more particularly to CCD based code readers for scanning and decoding high density two dimensional codes such as PDF417, as well as conventional bar codes.

BACKGROUND OF THE INVENTION

Known two dimensional code readers are of two types:

The first type—Flying spot scanners[7], employing a focused laser spot, scanning two dimensional codes both horizontally and vertically.

The second type—CCD based code readers[9], where the scanning is obtained electronically, using an imaging lens and an area image sensor, or a linear CCD array, utilizing either a scanning mirror or a manual scanning method for scanning in the vertical direction.

Spatial resolution is one of the most significant parameters of any bar code reader. It determines the narrowest bar or space, that can be decoded. Resolution is typically measured in units of mil (0.001 inch). As a rule, CCD-based code readers have higher resolution than laser scanners, which can be explained as following: The spatial resolution of flying spot laser scanners is determined by the minimal effective spot size of light, of the laser diode. This spot size is determined by the cross section of the focused laser beam in the working range, which is relatively large because of the diffraction limited beam waist in the center of the working range and moreover so at the ends of the working range. In CCD based readers, the optical projection system creates the code's image on the surface of the CCD detector array[1]. Optimal optical projection systems have Contrast Transfer Function (CTF), which allow to utilize effectively CCD sensors with a given pixel size so that the reader's spatial resolution at the surface of the code is determined solely by the size and number of the CCD array pixels.

Optical projection systems for reading two dimensional codes like PDF417 need to have a wide field of view angle. Objectives of this kind have typically complicated optical schemes using 7–8 single optical elements, leading to a high component cost. Moreover, the spatial resolution of such objectives is further limited at large field of view angles by off axis aberrations. Thus, the increase of spatial resolution of code readers, requires a new projection system design, that can yield high spatial resolution characteristics for a large area in the object's space, within the demanded working range.

Working range (WR) is another significant parameter for bar code readers. It specifies the longitudinal distance range within which reading and decoding can be accomplished. Conventional CCD bar code scanners have a limited WR, determined by the limited depth of field of the optical system. Thus devices of that type are usable for reading bar codes at fixed distances only. This limitation of CCD bar code readers can be overcome by means of autofocus optics[4,6,14].

Low reading sensitivity to the reader's holding position, is another significant parameter for code readers. The readers of two dimensional codes, available presently, are quite limited with this regard. Any small deviation from the optimal scanner position, prohibits code reading. The new type of reader, of the present invention, is capable of reading codes essentially at any rotational angle position. Furthermore, high speed processing techniques accelerate the code reading and decoding process.

SUMMARY OF THE INVENTION

An object of the invention is to increase the code reader's spatial resolution across the entire large field of view, or as known by the term: high space bandwidth product. This allows an increased information density of the two dimensional codes, up to the limit of the printing equipment resolution, used to print the code.

Another object of this invention is to increase the light level intensity at the CCD linear array's surface, by employing imaging optics of a large diameter to aperture ratio and by synchronizing the illumination with the image scanning.

Yet an additional object of this invention is to increase the light intensity uniformity of the illuminated images of the scanning lines on the CCD linear array, by employing similar angle magnitudes for the incident and reflected light from the target at all scanned surfaces of the code.

Yet an additional object of this invention is to minimize the sensitivity of the code reading capability to the rotational position of the reader, by employing electronic image rotation techniques.

BRIEF DESCRIPTION OF THE FIGURES

The invention is illustrated with reference to the enclosed schematical Figures, which are not according to scale in which:

FIG. 7 illustrates an illumination unit and the mirror scheme with a high reflectivity small central region.

FIG. 8 illustrates the illumination section and the mirror with a high reflectivity peripheral large area coating.

DETAILED DESCRIPTION OF THE INVENTION

Figure 1:
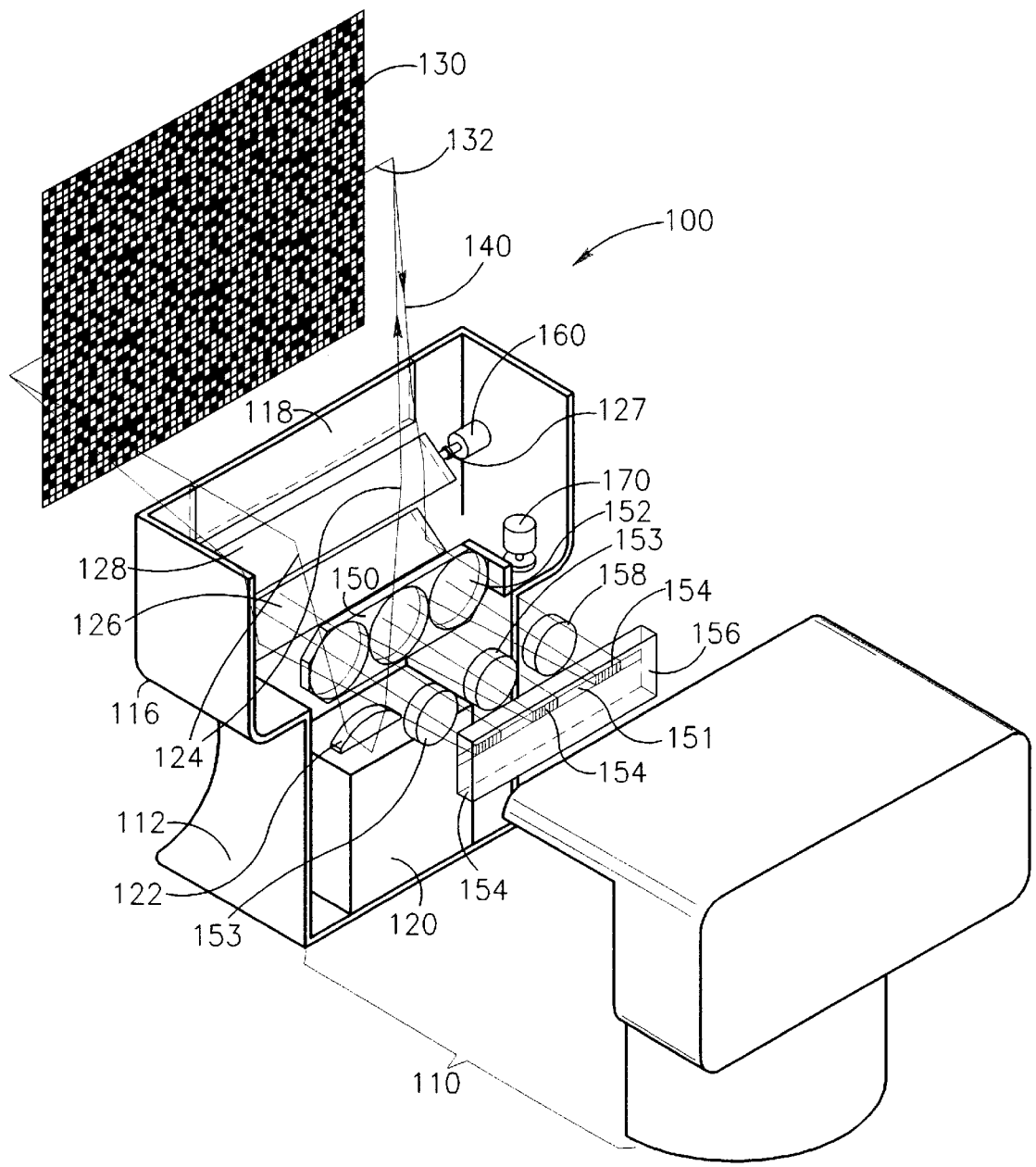
FIG. 1 illustrates a schematic view of the system.

FIG. 1 is an exploded view of system 100 which comprises a housing 110, having a base 112 and a cover 114. In the preferred embodiment, the housing parts are connected at an angle 116. The geometry of the housing is selected to optimize ease of use by a human operator. Yet in another embodiment, where the code reader is not manually operated but mounted on a surface, the system can be based on a different housing structure. The housing is used to place the inside parts of the system at fixed locations, as well as to protect them from any physical damage. The inside of the reader consists of the following main parts:

Illumination unit

Receiver unit

Electronics

A beam of monochromatic light, produced by source 120 is focused by means of optical system 122 into a narrow line 132. The source 120 is preferably a laser diode in range of the visible light 635–670 nm. The choice of a laser diode has several advantages: It is a compact, low cost and energy efficient light source. A large number of laser diodes, generating radiation in this spectral range, are available from different sources. A specific example is the 3500 Series Diode Laser Systems from UNIPHASE. That series of laser diodes is low cost, compact and generates a high quality beam with adequate intensity. The use of visible light in the spectral range of 635–670 nm has a following advantages:

⇒ User's ability to visually aim the raster pattern to the code,

⇒ the beam, reflected from the black and white printed code, surface has a maximal contrast in this spectral range, ⇒ this spectral range coincides with the range of maximum sensitivity for the CCD detector array.

Figure 6:
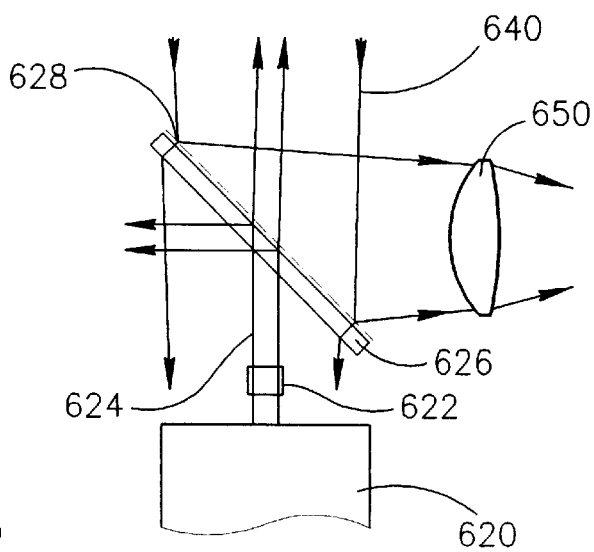
FIG. 6 illustrates an illuminating unit with focusing cylindrical optics and beam-splitter.

Very often laser diodes are fully integrated modules including beam correcting optics and diode driving electronics in one compact, cost-effective package. A cylindrical lens 122 generates a narrow line of laser light 124 with a fan angle sufficient to fully illuminate the code pattern within the working distance. The narrow focused line of light falls on the mirror 126 which is tilted by 45° to the output beam axis. In the embodiment depicted in FIG. 6 the surface of the mirror 626 is coated with a 50% reflection coating so that the light beam 624 in this spectral range is 50% reflected and 50% transmitted. Thus, the light beam generated by the laser diode, falls on the mirror, 50% of the light is deflected by 90° and 50% of the light passes through the mirror without any change of direction, and hits another mirror 128 at the same angle, which deflects the output beam by 90°. This beam exits through the housing window 118—a bandpass filter for the illumination's spectral range—and illuminates the code 130 in a way that the line of light 132 surpasses the edges of the code.

The mirror 128 has a scanning capability. Thus it can rotated using electromechanical means 160, by a predetermined reciprocal angle around an axis 127 located on its surface and parallel to the line of light 132 generated by the laser diode. During scanning, the horizontal beam of light moves consecutively across the object, covering the entire surface of the code, while surpassing it at the edges.

The light reflected from the code's surface, is diffused and propagates in a spatial angle of $2\pi$ steradians. The intensity of the reflected light is the largest in the direction of the mirror's specular reflection and decreases for larger angles between the direction of specular reflection and any other direction. A part of the diffused reflected light 140 from the illuminated pattern passes through the housing window, hits the receiver, i.e., the scanning mirror 128. The beam reflected from the scanning mirror in the direction of the mirror 126, is divided into two equal intensity beams by means of the semi-reflection coating of this mirror. The first beam is deflected by an angle of 90° while the second beam is transmitted through without a change of direction.

The deflected beam, which is the input beam, is transmitted by means of this mirror to the optical projection system 150, the axis of which coincides with the axis of the input beam. Thus the illumination and receiver parts are combined by means of the system of the two mirrors of the illumination section, which outputs a narrow divergent beam from the light source through the system housing window onto the code. Simultaneously these mirrors are mirrors of the receiver sub-system, which capture the diffused light, reflected from the code and pass it through the filter window housing.

Combining the illumination and receiver sub-systems by common mirrors, enables to utilize the reflected beam in the direction of maximum intensity. Furthermore, it allows synchronizing the illumination and receiver beam scanning and illuminate simultaneously only one horizontal line and thus increase the illumination brightness.

The light intensity across the horizontal lines is uniform, while the intensity of the line decreases slightly as the distance from the central scanning line increases. The decrease of light intensity is symmetrical to the central line. This difference from prior art increases significantly the uniformity of light intensity across the code and allows the system to read larger area codes. In this embodiment, passing the illumination beam through the mirror 126, with semi reflecting coating, and reflecting the input beam from it, causes a 75% loss of input light intensity without considering any other losses in the optical system. In the preferred embodiment, depicted in FIG. 7, the loss of light on the mirror 726 can be negligible. To implement this feature, mirror 726 has a central high reflectivity small region 721 used to reflect the focused illuminating light 724 from the source 720, while the rest of the mirror 723 is transparent to transmit the input beam 740, coming from the scanning mirror to the optical projection system in the receiver part.

In another embodiment, depicted in FIG. 8, mirror 826 has a transparent central small region 821, used to pass the focused illuminating beam 824 from the source 820, while the rest of the mirror 823 has a high reflectivity coating for reflecting the input diffused beam 840, reflected from the code and coming from the scanning mirror to the optical projection system.

Figure 2:
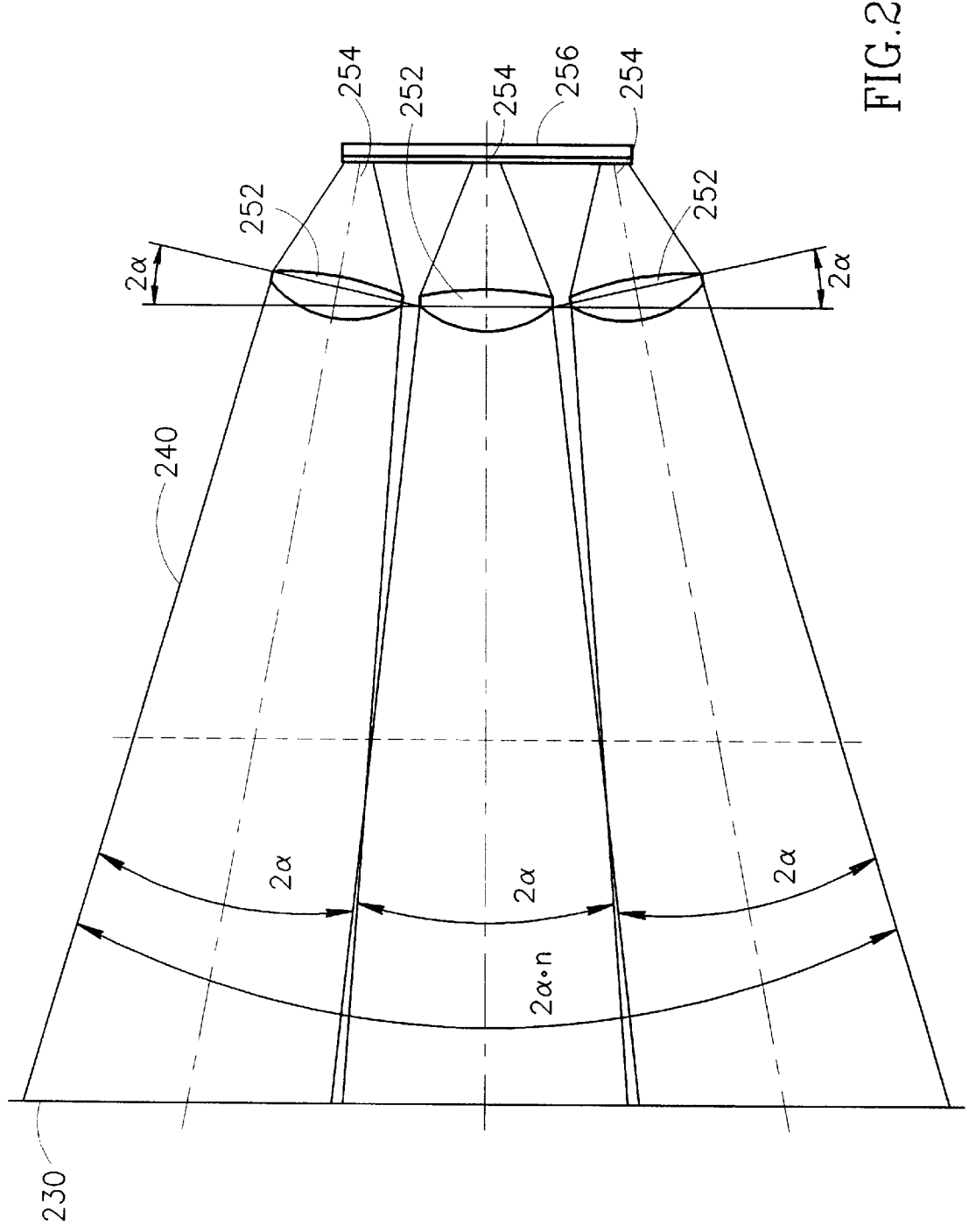
FIG. 2 illustrates a simplified optical scheme of the optical projection system. A linear lens array, inclined relatively to each other yields a high quality field of view angle.

The optical projection system that receives the diffused reflected light from the code's surface, is a horizontal linear lens array 150 consisting of lenses 152. As depicted in FIG. 2, each element of the array 252, generates on the conjugate surface, a separate image 254 of the code illuminated line, at each angular position of the scanning mirror.

To increase field of view of the system, in the working range, every lens 252 of the array is inclined in the horizontal surface relative to the adjacent lens by twice the field of view angle of a single lens at the closest object plane in the working range. The optimal field of view angle for a single lens is the angle which generates an image with the optimal resolution for a given CCD array 256 pixel size. Each single lens of the array, forms its own image of code line 230. The central part of the line, located around the lens optical axis, has optimal image quality characteristics while the resolution decreases further away from it towards the edges of the image. The close edges of two adjacent line image sections represent an overlap part on the object line.

The system field of view equals $2n\alpha$ where $\alpha$ is the field of view angle for a single lens of the lens array and n is the number of lenses. The image surface is inclined similarly to the inclination of the lens array elements. This creates some defocusing effect at the inclined image edges of each lens, depending on the angle of inclination. The outcome is some degradation in image resolution at the edges. It is known that the permissible defocusing allowed is proportional the pixel size and inversely proportional to the lens aperture. Thus if a small aperture is used, the defocusing effect will be negligible.

Figure 3:
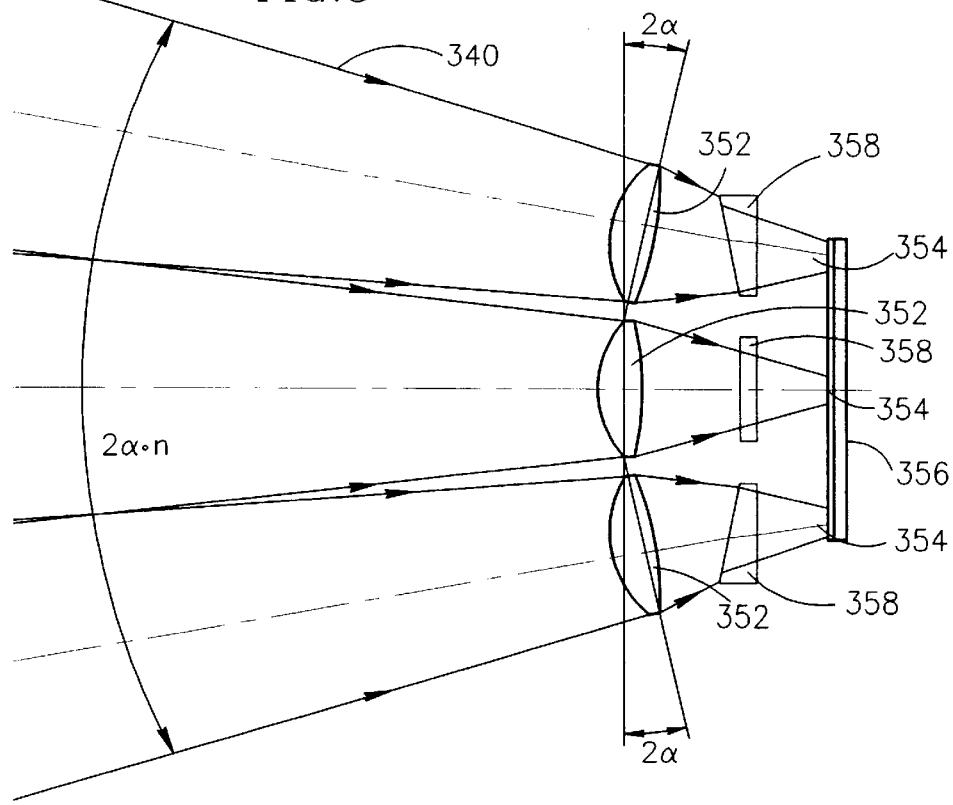
FIG. 3 illustrates a linear lens array with optical wedges positioned between the lenses and the CCD linear array.

In another embodiment, depicted in FIG. 3, the focused beams from the single lens pass from the lens 352 to the image plane through a corresponding array of optical wedges 358, deviating the focused beam to the normal of the general image plane. Under these conditions, the image surface of each lens coincides with the general image plane.

Figure 4:
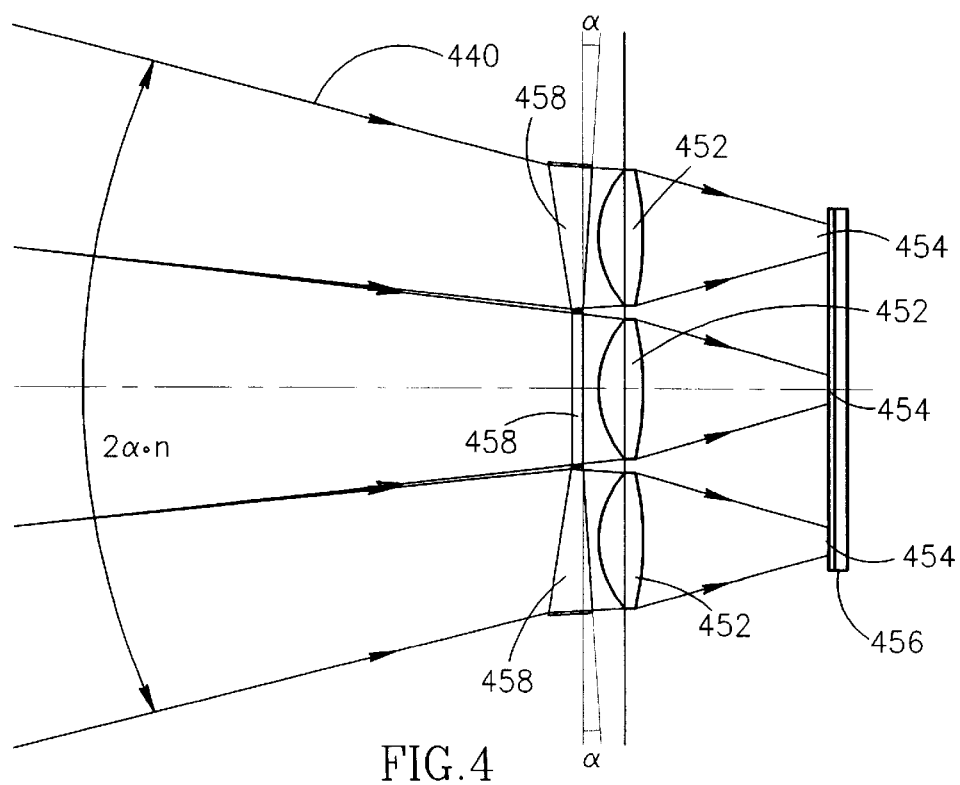
FIG. 4 illustrates a linear lens array with optical wedges positioned before the lenses.

In another embodiment, depicted in FIG. 4, the individual lenses of the lens array 452 are not inclined to each other and the optical wedges 458 are located symmetrically around the lens optical axis, between the mirrors of the receiver part and the lens array. Their size is defined by the full utilization diameter of each lens. The narrow ends of the optical wedges are directed towards the main optical axis of the system while the wedge angle is in the lens array axis plane. The magnitude of the wedges' angles, are determined as following: the light beams, in the space before the wedges, that pass through the wedges and are focused by the lenses, are inclined to each other at an angle which equals twice the field of view angle of a single lens. This yields, for the system, an overall field of view angle which equals $2\alpha n$.

Figure 5:
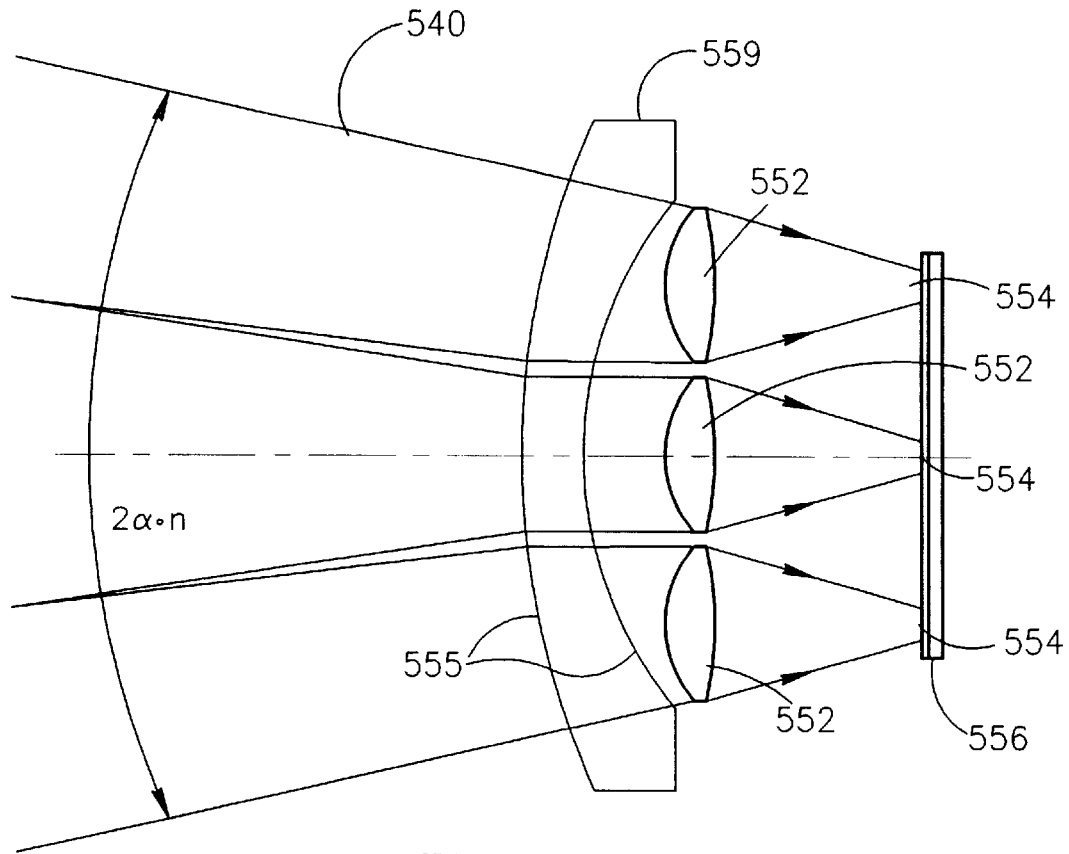
FIG. 5 illustrates a linear lens array with a cylindrical negative meniscus lens before the lens array.

In a preferred embodiment, depicted in FIG. 5, a negative meniscus lens 559 is used, in front of the lens array.

The surfaces 555 of this lens is oriented perpendicular to the lens array and light gathering is optimized for cylindrical surfaces. The size of the meniscus along the lens array is determined by the number of the lenses in the array, while the perpendicular dimension is determined by the single lens diameter. The material and radii of curvature of the lens, are determined by the required image quality of the single lens and the field of view of the system. The overall aberrations are determined by the joint optical system combined of the meniscus lens and the lens array. The use of a lens array in this system, is enabled by utilizing the system electronics to omit the double overlap parts of the image line sections and synthesize them into a single continuous image line signal.

For every object plane in the working range of the system, there exists a equivalent conjugate image plane. Any change in the location of the code within the working range, changes the location of the image plane. In one embodiment of the system, the location of the image plane is adjusted automatically by translating the optical projection system along the optical axis of the system. The optical projection system is translated mechanically by electromechanical means 170, based on feedback from the system electronics. The feedback is determined by calculating the contrast of the digitized signal line across the code. Thus the optimum location of the optical projection system is determined at the position where the signal gains a maximum contrast (patent reference). The high contrast nature of the code's signal is a contributing factor to the autofocus implementation.

A linear CCD array 156, is located in the general image plane, where the sectional line images are formed. The linear CCD array coincides with the sectional image lines. The pixel size of the CCD array is determined by the required spatial resolution in the code plane; the number of pixels in the array is determined by the optical projection system parameters, so that all the individual sectional images are located on the CCD array. Some extra number of pixels is needed to account for imperfect alignment of the optical system.

Image field diaphragms 151 are located in the CCD array plane, to differentiate those fields and to prevent diffused beam passed through a lens to hit the image fields of the neighboring lenses. The sizes of the diaphragms along the horizontal axis are determined so that the sectional images 154 partially overlap image sections of neighboring lenses. The magnitude of overlap is determined by the requirement of the electronics to synthesize the sectional image into an integrated continuous image line.

Figure 9:
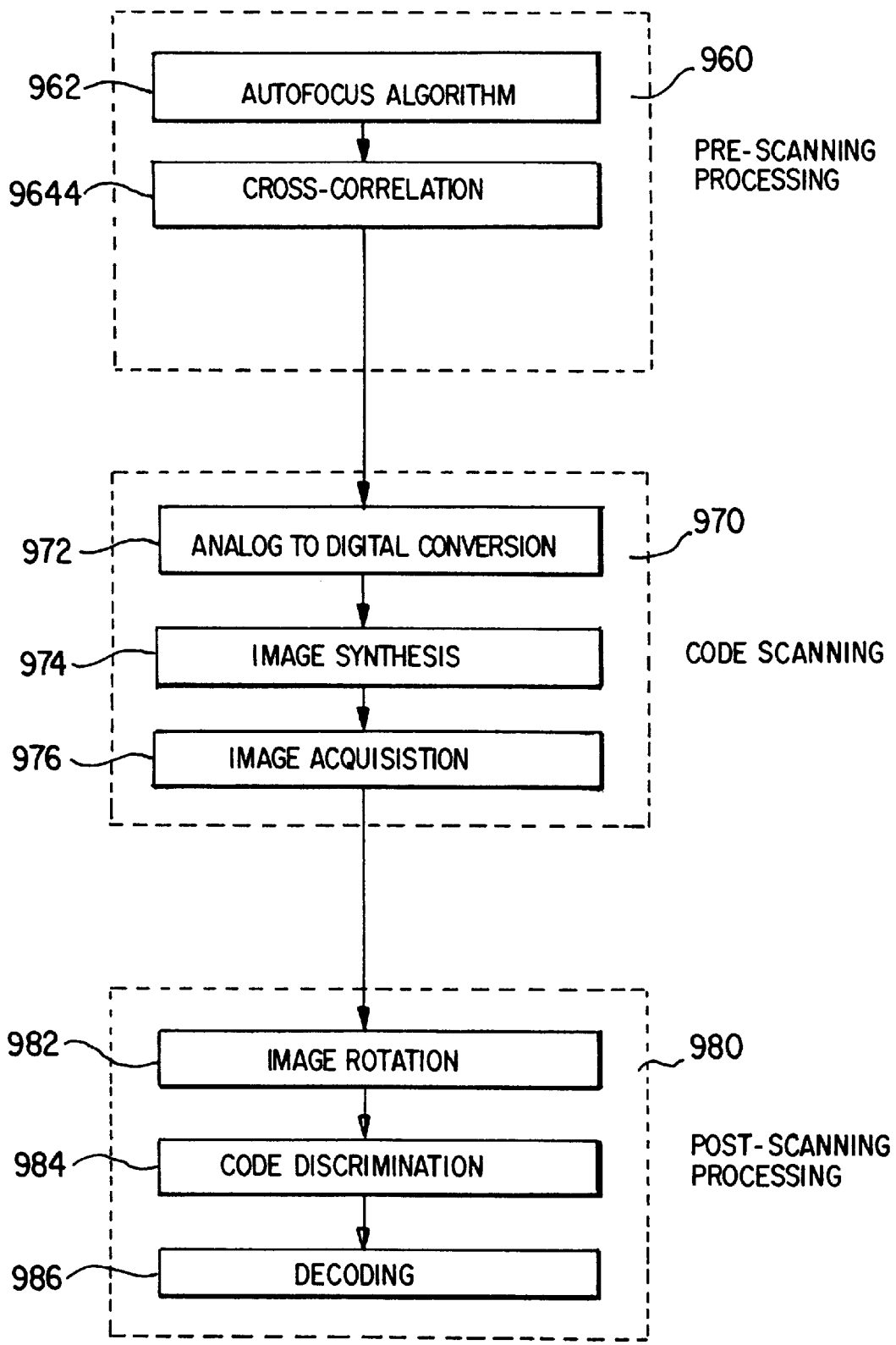
FIG. 9 illustrates a flow diagram of the electronics' main processing steps.

The main algorithmic processing steps performed by the system electronics, are depicted in the flow diagram of FIG. 9. Those can be divided into the following three parts:
Pre-scanning processing
Code scanning
Post-scanning processing Prior to scanning the code, the scanning mirror is fixed so that the system outputs a stationary illuminating line which can be aimed by the user to the center of the code. The pre-scanning processing algorithmic steps 960 performed during this time are those which require data from a single cross section of the code. The autofocus algorithm 962 provides to the autofocus electromechanical means 170, the feedback required to determine the optimum lens array position. The cross-correlation calculation 964 provides the overlap data required during the image synthesis step 974.

During code scanning 970, the scanning mirror rotates slightly so that the illuminating beam scans the entire code and the system performs the steps, required to store the digitized image into memory. Analog to digital conversion 972, is the first step which yields digital data from the electrical signal output of the CCD array. Image synthesis 974, prepares the data in real-time, during the scanning, to be stored in an integrated form. Image acquisition 976, stores the integrated data into memory.

The multi-element lens arrangement of the system, yields a combined large field of view angle with high performance image parameters all across the field. The outcome of combining n sectional views into a single large field of view, yields n-1 small overlap areas between the sectional views. These overlap areas generate double signal sections on the CCD array. A crosscorrelate electronic unit finds the exact location of the pixels in the overlap areas to yield an integrated single continuous synthesized image. The image synthesis is implemented electronically by calculating the crosscorrelation amount, between the signal end of one section and beginning of the signal of the following section. The point of maximum correlation would indicate the exact overlap area. The correlation can be expressed mathematically by the following function:

$$\sum_{i=i_0}^{i=i_0+N} s(i) \cdot s(i+k)$$

where
$i_0$—Is the first pixel of the correlation function.
N—Is the number of pixels summed up for the correlation function.
k—Is the parameter that determines the exact distance of pixels between the signal of one section and the corresponding overlap signal in the subsequent section.

The purpose of the calculation is to find the value of k, which determines the exact number of pixels between the two consecutive overlapping sections. This is performed by calculating repeatedly the crosscorelation function, until the maximum of this function is reached. Due to the high contrast nature of the signal, the crosscorelation function would have a well defined maximum point and thus would allow finding k quite easily. Since the distance in number of pixels between overlapping sections is invariable for a given working range, finding this number between every two consecutive sections, can be done as a calibration procedure and applied to the data acquisition during the scanning process.

Post-scanning processing 980 includes the algorithmic steps performed on the acquired image after the scanning, to yield the decoded data. Image rotation 982, measures the angle of rotation between the horizontal axes of the system and the code and restores the image data, correcting for that angle. Code discrimination 984 identifies automatically the type of code and determines whether the scanned code is two dimensional or a standard bar code. If a standard bar code is identified then it is decoded as a regular bar code. Decoding 986 decodes the code to yield the output data.

The horizontal scan lines of the scanner can be at any arbitrary angle with respect to the orientation of the code. This requires a 'rotation' of the code image by an angle amount that makes the digital code stored in memory, aligned with the orientation of the code. Code rotation is implemented in two steps:

1. Rotational angle measurement—Two dimensional codes like PDF417 include several vertical parallel lines on both sides of the code. Those can be instrumental in measuring the rotational angle between the reader position and the two dimensional code.

2. Image rotation—The calculation is based on the following xy rotational equation:

$$x(\text{new}) = \{x - x(0)\} * \cos\theta + \{y - y(0)\} * \sin\theta$$

$$y(\text{new}) = -\{x - x(0)\} * \sin\theta + \{y - y(0)\} * \cos\theta$$

The actual code rotation is implemented by a dedicated electronic module using lookup tables for the trigonometric functions and thus perform image rotation in real-time at the clock rate.

REFERENCES

U.S. Patent Documents 1. 4,900,907 Matusima et al., February 1990
2. 4,935,609 Wike et al., June 1990
3. 5,155,343 Chandler et al., October 1992
4. 5,192,856 Schaham, March 1993
5. 5,192,857 Detwiler, March 1993
6. 5,210,398 Metlitsky, May 1993
7. 5,233,170 Metlitsky et al., August 1993
8. 5,296,690 Chandler et al., March 1994
9. 5,304,786 Wang et al., March 1994
10. 5,319,181 Shellhammer et al., June 1994
11. 5,319,185 Obata, June 1994
12. 5,335,007 Choi, August 1994
13. 5,378,881 Adachi, January 1995
14. 5,387,786 Peng, February 1995

We claim:

1. A method for reading and decoding a two dimensional high resolution data presentation in a far field, comprising:

projecting and illuminating a narrow monochromatic line form light beam onto a two dimensional object;

scanning the two dimensional object in a direction perpendicular to the illuminating line;

relaying diffused light reflected off a plane of the object via a light projection system to a dynamically focusing imaging means;

imaging the illuminated line as several sub-aperture separate images onto a linear detector array;

electronically synthesizing the sub-aperture separate images into an integrated image line;

digitizing and storing the integrated image line as scanned image data;

rotating the stored scanned image data to obtain a proper image orientation; and decoding the scanned image data.

2. A system for reading and decoding information which is encoded as an array of consecutive rows of black and white squares, comprising:

means for illuminating code, for detecting a diffused light reflected off a surface of the code, for converting the detected diffused light into electrical digital signals and for decoding data carried by the code;

a housing;

an illumination unit disposed in the housing, said illumination unit comprising:

a filter window;

a source of directed monochromatic radiation; and optics for focusing radiation from a light source to a narrow dispersed light beam;

a system of two mirrors, light placed following each other on a direction of a light beam from the light source, placed at an angle to an axis of the beam, said two mirrors directing the light beam through the window, so that the light beam illuminates two dimensional code along an horizontal axis;

a receiving unit, comprising:

a filter window;

an input system of two mirrors, positioned one after the other in a direction of the light reflected off the surface of the code and entering the system through the window; and an optical projection system which receives the diffused light reflected off the surface of the code through said window and the receiving mirrors and focuses the light beams to create an image of the code in a conjugate image plane;

sub-aperture diaphragms;

a linear CCD array, positioned in the conjugate image plane, which plane is a conjugate to the surface of the code, autofocus electromechanical means for translating projection optics to yield a focused image at a plane of said CCD array at varying ranges of said system from the surface of the code;

an electronics system, comprising:

an image synthesizer module for generating a single continuous image line from original partially overlapping sub-images obtained from the optical projection system;

an image rotation module, including means to rotate an image of the code acquired at any angular position of the system;

an autofocusing module, including a means to provide focusing feedback data to said autofocusing module; and a general processing module, including a code classifying and coding means.

3. The system according to claim 2, wherein the mirrors of said illuminating unit, which output the illuminating beam, are used by the receiving unit to input the light beam reflected off an object's surface, in a manner where an output beam and an input beam are scanning the object synchronously.

4. The system according to claim 3, wherein the second mirror of the illuminating unit, which is the first mirror of the input beam in the receiving unit, is adapted to scan a vertical axis of the two dimensional code, by changing an angular position of said mirror, which moves an horizontal output light beam vertically and a corresponding line of the code onto the optical projection system of the receiving unit.

5. The system according to claim 3, wherein the first mirror, on an output beam axis, of the illuminating unit has a small reflective coated central region which reflects a focused light beam emanating from the source, and a remaining portion of the mirror, which is transparent, is used to pass the diffused reflected beam from the surface of the code on its way from a scanning mirror to the optical projection system.

6. The system according to claim 3, wherein the first mirror of the output beam of the illuminating unit has a small transparent central region which passes a focused light beam coming from the light source to a scanning mirror, and a remaining portion of the mirror is a high-reflectivity-coating surface, which directs the diffused reflected light from the surface of the code on its path from the scanning mirror to the optical projection system.

7. The system according to claim 3, wherein the first mirror of the output beam of said illuminating unit has a semi-transparent coating, where half of a focused light beam coming from the light source to a scanning mirror, is passed through, while half of the diffused light reflected from the surface of the code, on its path through the scanning mirror, is reflected by this light mirror to the optical projection system.

8. The system according to claim 2, wherein said optical projection system that receives the diffused light beams reflected by the surface of the code, comprises a linear lens array mounted on a common horizontal base line, parameters of said lenses are optimized to yield a maximum image quality for the illumination unit and a given working range, and sub-aperture horizontal code images are generated by said lenses in the plane of said CCD linear detector array so that edges of each sub-aperture image slightly overlaps with edges of a sub-aperture image of a neighboring lenses.

9. The system according to claim 2, wherein said optical projection system comprises a linear lens array having individual lenses which are inclined to each other in a horizontal plane, an angle of inclination is equal to twice a field of view angle of the individual lens to create a code's surface such that each lens creates a high quality sectional image of part of a horizontal line on the surface of the code so that an overall field of view angle of the system equals $2\alpha N$, where $\alpha$ equals a field of view of the individual lens and N equals a number of individual lenses in the lens array.

10. The system according to claim 9, wherein light beams focused by the lenses are directed at the CCD linear detector array, through horizontally arranged optical wedges, which deflect the light beams in a direction normal to the plane of the CCD detector array.

11. The system according to claim 8, wherein the diffused light reflected off the surface of the code which pass through the two receiver mirror system, pass through an array of optical wedges, the optical wedges, centered on an optical axis of each of the lenses, deflect input beams so that sub-images created by the lenses of the lens array, are in the image plane of the linear lens array, top angles of the wedges are directed to a central optical axis of the system, and the wedges are inclined to each other in an angle so that an overall field of view angle of the system equals $2\alpha N$, where $\alpha$ equals a field of view of the individual lens and N equals a number of individual lenses in the lens array.

12. The system according to claim 8, wherein the diffused light reflected off the surface of the code and passed through the two receiver mirror system, pass through a negative meniscus lens, an outer diameter of the meniscus lens along the horizontal axis is determined by an overall dimension of the linear lens array while a width of the meniscus lens in a perpendicular axis is determined by a single lens diameter; and the meniscus lens optimizes an image quality in the plane of the CCD linear array and in a field of view of the system.

13. The system according to claim 8, wherein a series of diaphragms is disposed in the plane of the said CCD linear detector array, a dimension of each diaphragm along an horizontal axis, is determined by a field of view of an individual lens of the lens array, the field of view of each lens partially overlaps with the field of view of a neighboring lenses, and a size of an overlapping section is optimized for the synthesizer module which generates an integrated continuous line from sectional line images.

14. The system according to claim 2, wherein the image synthesizer module generates an integrated continuous image line from sub-image line sections generated by the optical projection system and converted to an electrical signal by the CCD linear array, image synthesis is implemented by omitting pixels at edges of partial image sections which include overlap image areas, and an overlap area is determined by a cross-correlation function and applied to the image synthesizer module to synthesize a digital image signal in real-time.

15. The system according to claim 2, wherein the means for rotating the image of the code rotates the image in real-time by an angle equal and opposite in direction to an angle between the horizontal axis of the code to an horizontal axis of the system, and to lower reading sensitivity to an angular position of the system, an angle of rotation is measured via vertical reference code lines on the surface of the code and applying the angle of rotation to a dedicated rotation angle electronics module, which rotates the image in real-time.

* * * * *